United States Patent Office 2,798,035
Patented July 2, 1957

2,798,035

MANUFACTURE OF ACRYLONITRILE

Frank Derbenwick, Riverside, and Albert W. Jefts, Glenville, Conn., assignors to American Cyanamid Company, New York, N. Y., a corporation of Maine No Drawing. Application October 5, 1955,
Serial No. 538,785

2 Claims. (Cl. 202—57)

This invention relates to the preparation of acrylonitrile. More particularly, it relates to the refining of crude acrylonitrile prepared by the catalytic reaction of acetylene with hydrocyanic acid.

In the preparation of acrylonitrile by reacting HCN and acetylene, it is customary to scrub the reactor gas with water to absorb the acrylonitrile. In this manner, a dilute aqueous acrylonitrile solution is obtained, containing various impurities such as HCN, acetaldehyde, lactonitrile, acetylene, monovinylacetylene, cyanobutadiene, and the like. The dilute aqueous acrylonitrile solution is then usually subjected to steam stripping to recover the acrylonitrile in a more concentrated form. The resultant concentrate may then be treated by any of various procedures to separate the impurities.

In the acetylene-HCN process for the manufacture of acrylonitrile, the purification is difficult and complicated. Because of its relative simplicity and effectiveness, therefore, purification by distillation is usually considered the most preferred method. Even so, purification by distillation is not free from disadvantages. One of the most serious of these is polymer formation within the distillation columns. This polymer formation represents a loss in yield of acrylonitrile. More important, however, is that the polymer plugs the columns and makes it impossible to operate continuously for even short periods of time. The result is frequent equipment shutdown and excessive maintenance requirements.

It is an object of this invention to minimize polymer formation during the distillation purification of the preparaton of acrylonitrile by the HCN-acetylene method. It is a further object to increase the yield of acrylonitrile obtained when purifying by distillation. It is a still further object to substantially eliminate shutdowns for maintenance of polymer-plugged distillation columns thereby rendering the distillation procedure truly continuous.

These objects should be met by a process which is simple and economical. It should not involve additional apparatus requirements over those normally employed. It should not require the use of unusual chemical reagents. Nor should it involve the use of reagents difficult to recover.

In accordance with this invention, these objects have been met by a process which is extremely effective, yet surprisingly simple. The process of this invention comprises maintaining in the aqueous acrylonitrile solution obtained from the scrubber an amount of free HCN in molar excess of that stoichiometrically required to react with substantially all free acetaldehyde. The amount of excess HCN needed to obtain the desired stabilization is not critical. It is sufficient that it be greater than the stoichiometric amount needed to convert substantially all aceuldehyde to lactonitrile. The presence of excess HCN in the aqueous and crude acrylonitrile solutions may be provided for in any suitable manner. Preferably, the HCN feed to the HCN-acetylene reactor is such as to insure the necessary excess. The excess of HCN, however, may just as well be provided for by adding sufficient HCN directly prior to, following, or during the steam stripping operation.

The process of this invention is further illustrated by the following examples. All parts are by weight unless otherwise noted.

EXAMPLE 1

A crude wet acrylonitrile having the following composition

| Compound: | Weight percent |
|---|---|
| Free acetaldehyde | 4.0 |
| Free HCN | 0.3 |
| Lactonitrile | 3.5 |
| Cyanobutadiene | 0.3 |
| Water | 3.0 |
| Acrylonitrile | 88.3 |

Wt. of free HCN that would be required to react with all free $CH_3CHO = 2.46\%$.

and a molar ratio of $$\left(\frac{\text{free HCN} + \text{lactonitrile}}{\text{free } CH_3CHO + \text{lactonitrile}}\right) = 0.43$$

is subjected to distillation. After operating for only one day, the distillation column becomes plugged and must be shut down for maintenance.

EXAMPLE 2

The procedure of Example 1 is repeated except that the crude wet acrylonitrile has the following composition

| Compound: | Weight percent |
|---|---|
| Free acetaldehyde | 0.5 |
| Free HCN | 3.5 |
| Lactonitrile | 8.5 |
| Cyanobutadiene | 0.3 |
| Water | 4.0 |
| Acrylonitrile | 82.6 |

Wt. percent of free HCN required to react with all of the free $CH_3CHO = 0.31\%$.

and a molar ratio of $$\left(\frac{\text{free HCN} + \text{lactonitrile}}{\text{free } CH_3CHO + \text{lactonitrile}}\right) = 1.9$$

No column plugging is observed after operating for six months.

EXAMPLE 3–12

A series of experiments are conducted with acrylonitrile containing various relative amounts of acetaldehyde and HCN to determine the stability of the acrylonitrile against polymerization. The method utilized is the oxygen bomb induction period method (A. S. T. M. D525–39T), which is commonly employed in the gasoline industry for testing the stability of gasolines. The application of this method to the testing of the stability of acrylonitrile is described in United States Patent No. 2,432,511. The longer the induction period, the more stable the acrylonitrile. Results appear below in Table I.

Table I

| Ex. No. | Composition of Acrylonitrile Solution, Wt. Percent | | | Mol Ratio of $\left(\dfrac{\text{Free HCN+LN}}{\text{Free CH}_3\text{CHO+LN}}\right)$ | Induction Period in Oxygen Bomb Before Polymerization, Minutes |
|---|---|---|---|---|---|
| | Lactonitrile | Free HCN | Free CH$_3$CHO | | |
| 3 | 1.920 | 0 | 4.0 | 0.23 | 21 |
| 4 | 1.970 | 0 | 2.6 | 0.32 | 39 |
| 5 | 1.980 | 0 | 0.75 | 0.62 | 28 |
| 6 | 1.980 | 0 | 0.3 | 0.80 | 46 |
| 7 | 1.980 | 0.074 | 0 | 1.10 | 58 |
| 8 | 1.980 | 0.140 | 0 | 1.19 | 96 |
| 9 | 2.030 | 0.23 | 0 | 1.30 | 305 |
| 10 | 2.010 | 1.18 | 0 | 2.54 | No polymerization after 720 minutes. |
| 11 | 1.990 | 2.51 | 0 | 4.32 | |
| 12 | 1.970 | 3.67 | 0 | 5.90 | |

We claim:

1. A method of refining a crude acrylonitrile solution containing acetaldehyde which comprises providing therein a free-HCN content in excess of that stoichiometrically equivalent to the acetaldehyde content and subjecting resultant solution to distillation.

2. In the preparation of acrylonitrile in which HCN and acetylene are reacted to form an acrylonitrile-bearing gas, said gas is scrubbed with water to form a dilute solution of acrylonitrile in water containing acetaldehyde, HCN and lactonitrile, said solution is subjected to steam stripping to concentrate it, and resultant concentrated acrylonitrile is treated to produce a purified acrylonitrile product, the improvement in combination therewith which comprises: providing in said concentrated acrylonitrile a free-HCN content in excess of that stoichiometrically equivalent to the acetaldehyde content.

References Cited in the file of this patent

UNITED STATES PATENTS

| 2,370,849 | Dutcher | Mar. 6, 1945 |
| 2,385,327 | Bradley et al. | Sept. 25, 1945 |
| 2,385,551 | Spence et al. | Sept. 25, 1945 |
| 2,419,186 | Harris et al. | Apr. 15, 1947 |
| 2,653,966 | Taylor et al. | Sept. 29, 1953 |
| 2,664,396 | Riley | Dec. 29, 1953 |
| 2,719,169 | Croes et al. | Sept. 27, 1955 |
| 2,733,289 | Croes et al. | Jan. 31, 1956 |